April 28, 1936.  F. G. FOLBERTH ET AL  2,039,076
CONTROL MECHANISM FOR FLUID PRESSURE ACTUATED DEVICES
Filed Dec. 11, 1931  2 Sheets-Sheet 2
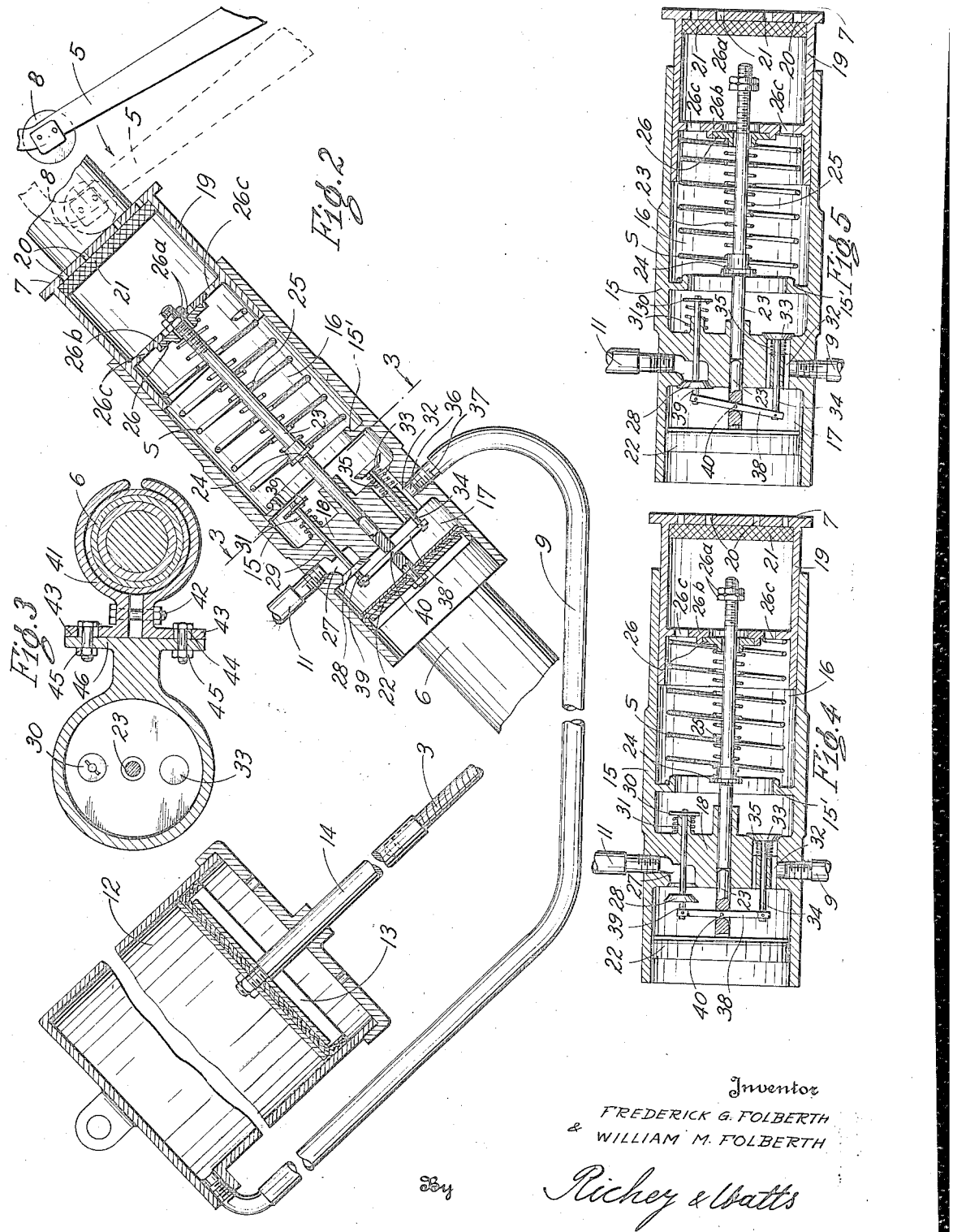
Inventor
FREDERICK G. FOLBERTH
& WILLIAM M. FOLBERTH
By Richey & Watts
Attorneys Patented Apr. 28, 1936

2,039,076

UNITED STATES PATENT OFFICE 2,039,076

CONTROL MECHANISM FOR FLUID PRESSURE ACTUATED DEVICES

Frederick G. Folberth and William M. Folberth, Cleveland, Ohio

Application December 11, 1931, Serial No. 580,376

3 Claims. (Cl. 303—54)

This invention relates to control mechanism for fluid pressure actuated devices and more particularly to valves for controlling the flow of actuating fluid to the operating cylinder of a fluid pressure operated brake actuating device for automotive vehicles.

In our United States Patent No. 2,011,334, we have described and claimed an improved type of fluid pressure actuated apparatus for applying the brakes of a motor vehicle. The present invention is particularly adapted for use with this type of apparatus, and has among its objects the provision of a simple control valve, susceptible to economical manufacture, for controlling the operation of fluid pressure actuated brake applying apparatus.

Other objects of our invention are the provision of a control valve for fluid pressure actuated brakes which will give a smooth and even braking action; the provision of a control valve for fluid pressure actuated brakes which is particularly adapted to be engaged and operated by movement of the vehicle clutch pedal; the provision of a control valve which will give a certain definite braking action for each successive increment of its operating movement, and the provision of a control valve which incorporates, in extremely simple form, an air filter for filtering the air entering the valve from the atmosphere.

The above and other objects of our invention will appear from the following description of a preferred form thereof, reference being had to the accompanying drawings, in which—

Fig. 2 is an enlarged view illustrating our improved control valve in vertical cross-section, together with the brake actuating cylinder and piston and the vehicle clutch pedal.

Fig. 3 is a section taken on line 3—3 of Fig. 2.

Fig. 4 is a sectional view of our improved control valve, generally similar to Fig. 2, but illustrating the parts in the positions they assume when the valve is moved in opening direction.

Fig. 5 is a view similar to Fig. 4, illustrating the parts of our valve in an intermediate position.

Figure 1:
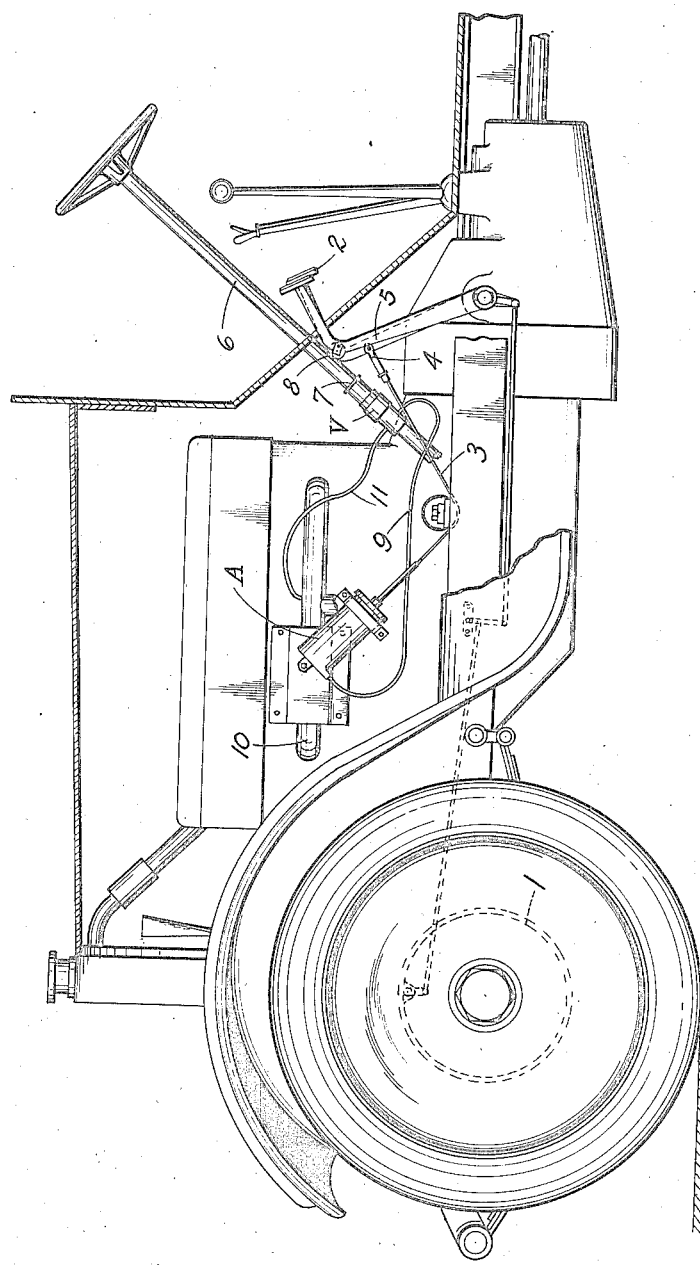
Fig. 1 is a side elevation, partly in section, illustrating an automobile having fluid pressure actuated brakes and showing our improved control valve installed.

In our United States patent, above mentioned, the control valve which governs the application of vehicle brakes is adapted to be operated by a movement of the vehicle clutch pedal, and, in the present application, we have illustrated a similar arrangement.

Referring to Fig. 1, the brake 1 may be connected by any suitable arrangement to be operated in the normal manner by the foot pedal 2. The fluid pressure brake operating mechanism, generally indicated at A, may consist of a cylinder and piston, the piston being connected to operate the vehicle brakes through the cable 3, which is secured to the brake pedal 2 at 4. A standard type of clutch operating system may be used and the pedal 5 may be connected in the usual manner to disengage the clutch when it is depressed. Our improved valve mechanism, generally indicated at V, is secured to the steering column 6 and is so disposed that its operating end 7 is adapted to be engaged by the small roller 8 which is secured to the clutch pedal 5.

The cylinder of the brake operating apparatus is connected to the valve V by the conduit 9, and the valve V is connected to the intake manifold 10 of the vehicle engine through the conduit 11.

Briefly, the operation of the system is as follows: When the operator depresses the clutch pedal 5 the first part of its movement disengages the vehicle clutch. After the clutch is completely disengaged the roller 8 strikes the end 7 of the operating plunger of the valve V and further downward movement of the clutch pedal opens the valve to connect the intake manifold suction to the cylinder of the brake operating apparatus. This causes the vehicle brakes to be applied, and, due to our improved valve construction, the further down the clutch pedal 5 is moved the greater will be the suction applied to the cylinder of the brake operating device, and, therefore, the greater will be the braking effect. As seen in Fig. 2, the brake operating mechanism is extremely simple, consisting essentially of a cylinder 12 suitably mounted in the vehicle and a piston 13 to which is connected the piston rod 14 and the brake operating cable 3.

The present invention relates primarily to the control valve V and its detailed construction will best be seen from Figs. 2, 3, 4 and 5. The main body 15 of the valve consists of two open end cylindrical portions 16 and 17, which are separated by the partition or dividing wall 18. The operating plunger 19 is also of tubular construction and has a telescoping fit within the cylinder 16. The closed end 7 of the plunger 19 is adapted to be engaged by the roller 8 on the clutch pedal 6. A plurality of holes 20 extend through the end 7 of plunger 19 and provide a connection to the atmosphere, as will be more fully explained later. A disc shaped member 21 of felt or other suitable material is disposed within the tubular plunger 19 directly behind the holes 20 and serves to filter the air which enters the valve from the atmosphere. A piston 22 is mounted for reciprocating movement in the cylindrical end portion 17 of the valve housing. This piston 22 carries a piston rod 23 which extends through and has a suitable bearing in the dividing wall 18. The end of the rod 23 extends into the chamber formed by the cylindrical portion 16 of the valve body 15 and the telescoping tubular plunger 19. A shoulder 24 is formed on or secured to the rod 23 and a coil spring 25 surrounds the rod 23 and is supported at its lower end on the shoulder 24. The upper end of spring 25 abuts against the flanged sleeve 26 which has a sliding fit on the rod 23. The initial load on the spring 25 is adjusted by the nuts 26a which have threaded engagement with the end of the rod 23. A web 26b extends across the tubular plunger 19 and is provided with holes 26c so that air may pass freely thereby. This web 26b is adapted to engage and guide the flanged sleeve 26 and to transfer movement of the plunger 19 to the piston rod 23 through the spring 25. The large coil spring S is disposed within the portion 16 of the body 15 and seats at its lower end upon the inwardly projecting flange 15'. This spring S extends up into the tubular plunger 19 but preferably stops short of the web 26b for reasons which will appear later.

The conduit 11 which leads to the intake manifold of the vehicle engine is connected to a passage 27 which extends through the dividing wall 18 into the cylindrical chamber 17. This passage is adapted to be closed by a valve 28 which has a seat on the dividing wall 18. The valve stem 29, which carries the valve 28, extends up through and has a bearing in the dividing wall 18. The upper end of the valve stem 29 is provided with a flange 30 and the compression spring 31 tends to maintain the valve 28 in closed position.

The chamber 17 is connected to the chamber 16 by a passage 32 and this connection is adapted to be closed by a valve 33. The valve 33 is carried by a valve stem 34 which extends through and has a bearing in the dividing wall 18, and a coil spring 35 is disposed around the valve stem 34, beneath the valve 33, and tends to maintain the valve 33 in open position. A passage 36 extends from the passage 32 to the outside of the body of the valve 15 and the conduit 9 may be connected to this passage 36 in any suitable manner, as by the threaded tube 37.

The valves 28 and 33 are interconnected by means of a rocking bar 38 which is pivotally connected at its ends to the lower end of the valve stem 34 and to the extension 39 of the valve stem 29. The rocking bar 38 passes through a suitable aperture in the piston rod 23, this aperture being so formed as to permit a certain degree of rocking movement of the bar 28. A pin 40 may be provided to prevent longitudinal movement of the bar 38 in the aperture in the piston rod 23.

As best seen in Fig. 3, the entire valve assembly is secured to the steering column 6 by means of a clamp 41 which may be clamped to the steering column by the bolt 42. The clamp members carry flanges 43 having slotted holes 44 for the attaching bolts 45. These bolts 45 pass through corresponding holes in the bracket portion 46 of the valve housing and secure the valve to the clamp.

It will be understood by those skilled in the art that our improved control valve may be mounted at any suitable location on a vehicle, the illustrated mounting being only one of a number of possible installations. It will be further understood that the piston 22 may be replaced by a suitable diaphragm and that the lift of the valves 28 and 33 may be made less than that illustrated in the drawings to make the apparatus more sensitive to very slight movement of the plunger 19.

Assuming now that the control valve is installed as illustrated in Figs. 1 and 2, the operation of our apparatus is as follows:

When there is no downward pressure exerted on the plunger member 19, the piston 22 and the valves 28 and 33 will be in the positions illustrated in Fig. 2. When in these positions the suction connection to the manifold through the conduit 11 will be completely closed by the valve 28 and the cylinder 12 will be connected to the atmosphere through the conduit 9, the passage 36, the passage 32, the interior of the upper end of the housing 15 and the holes 20 in the end 7 of the plunger 19. This atmospheric connection permits the brake retracting springs to hold the brake bands free of the brake drums and the piston 13 will be drawn to the lower end of the cylinder 12. The manifold suction will tend to maintain the valve 28 in closed or seated position.

When pressure is exerted on the end 7 of the plunger 19 this pressure is transmitted through the spring 25 to the piston rod 23 and the piston rod 23 and piston 22 will be moved downwardly a certain distance, for example into the position illustrated in Fig. 4. This downward movement of the piston rod 23 will carry with it the rocking arm 38, which in turn will move the valve 33 to close the passage 32 from the chamber 16, and in like manner move the valve 28 to open the passage 27 to the chamber 17. During the downward movement of the piston rod 23 the parts will pass through the intermediate position shown in Fig. 5. This is due to the suction on the valve 28 and the fact that the bar 38 is pivoted at its center thus causing the valve 33 to close before valve 28 opens. When the parts are in the position shown in Fig. 4, a direct connection is established between the cylinder 12 and the intake manifold of the engine through the conduit 9, the passage 36, the passage 32, the chamber 17, the passage 27, and the conduit 11. The suction of the manifold will now cause the piston 13 to move upwardly in cylinder 12 and this movement will, through the cable 3, pull the brake lever 2 downwardly and apply the vehicle brakes in the usual manner.

As the air is withdrawn from the chamber 17, a certain degree of vacuum will be built up therein an eventually the atmospheric pressure on the outside end of the piston 22 will be sufficient to overcome the spring 25 and the piston 22 will be moved to the right until it assumes the position shown in Fig. 5. During this movement of the piston 22 the valve 33 will remain closed due to the atmospheric pressure on its top side and the valve 28 will be closed. This action takes place because of the pivoted support of the rocking arm 38 in the piston rod 23. In this position (Fig. 5) the intake manifold vacuum is shut off, the atmospheric connection is shut off, and the piston 13 will remain in position to apply the brake. Now, upon further downward movement of the plunger member 19, the spring 25 will be further compressed and the atmospheric pressure against the bottom of the piston 22 will be overcome and the valve 28 again opened. This will permit more air to be withdrawn from the cylinder 12 and the vacuum in the chamber 17 will be reduced a corresponding amount. However, when this vacuum is reduced to a certain degree the atmospheric pressure on the outside of the piston 22 will again be sufficient to overcome the spring 25, and the valve 28 will again be closed. During this operation the valve 33 will remain closed, due to the reduced pressure on its under side and atmospheric pressure on its top side which tends to hold it in closed position and makes it easier for the valve 28 to close than it is for the valve 33 to open.

When the downward pressure on the plunger 19 is released the reverse of the action above explained takes place and the vehicle brakes will be released an amount proportionate to the amount the pressure on the spring 25 is released. The spring 25 is preferably maintained under a certain relatively small degree of compression by the flanged sleeve 26. This degree of initial compression may be adjusted by the nuts 26a. The object of this initial compression is to cause the first movement of the plunger 19 from the position shown in Fig. 2 to complete the suction connection and to maintain it open until at least a desired minimum braking effect is produced. The spring 25 is preferably made relatively light so that the piston 22 will not have to be of great diameter. If the spring 25 were not given the initial compression, as above described, the first movement of the plunger 19 to compress the spring 25 and open the valve 28 would almost immediately to overcome by the atmospheric pressure on the piston 22 and the vacuum connection would be closed off. By providing the initial compression of the spring 25 the vacuum connection cannot be closed off until the pressure differential between the effective vacuum and the atmosphere is great enough to move the piston 22 against the initial compression of the spring 25, thus closing the valve.

The large coil spring S is intended merely to increase the resistance to the movement of the plunger 19 so that the operator of the vehicle can tell by the feel of the pedal when he has reached the brake operating portion of its stroke. As indicated, the upper end of the spring S stops short of the web 26b of the plunger 19. This permits the first relatively short downward movement of the plunger 19 to take place without any resistance except that of the spring 25. If desired the initial compression of the spring 25 may be set so that when the plunger 19 is moved downwardly until it just strikes but does not compress the spring S, the valve mechanism will be operated to move the piston 13 in the cylinder 12 to take up all of the lost motion in the vehicle brakes. Further downward movement of the plunger 19 will be against the spring S and will, due to the fact that the brakes are in clearance take-up position, cause the immediate application of the brakes.

It will be seen from the above explanation of the operation of our improved control mechanism that it provides means for smoothly and evenly applying the vehicle brakes. The braking effort will be governed in accordance with the degree of movement of the operating plunger and our apparatus is such that, when the operator holds the pedal in any position, the brakes will remain applied until he either releases the pedal to permit the brakes to be released or moves it in brake applying direction to increase the brake application.

Although we have described the illustrated embodiment of our invention in some detail it will be understood by those skilled in the art that variations and modifications thereof may be made without departing from the spirit of our invention. We do not, therefore, limit ourselves to the precise details shown and described, but claim as our invention all embodiments thereof coming within the scope of the appended claims.

We claim:

1. A control valve of the class described, comprising a body portion having oppositely disposed cylindrical portions and a dividing wall therebetween, a piston in one of said cylindrical portions, a piston rod secured to said piston and extending through said dividing wall into the other of said cylindrical portions, an operating plunger having telescoping engagement with said last named cylindrical portion, resilient connecting means between said plunger and piston rod, said dividing wall having a passageway for connecting the cylindrical portion in which the piston is disposed to a source of reduced fluid pressure, a passageway connecting said cylindrical portions and a passageway leading from said last named passageway to the outside of the valve body, poppet valve means for controlling said reduced fluid pressure passageway and the passageway connecting said cylindrical portions, and operating connections between said piston rod and valve means.

2. In valve mechanism of the type described a closure member adapted to control the flow of fluid under actuating pressure, a piston, operating connections between said piston and closure member, fluid conducting connections whereby fluid under actuating pressure will be applied to said piston to tend to move the piston to close said closure member, spring means for resisting movement of said piston to close said closure member, an operating plunger adapted to vary the resistance offered by said spring means, and resilient means for resisting movement of said plunger in valve opening direction, said resilient means being effective to resist movement of said plunger only after said plunger has been moved to increase the resistance of said spring means a predetermined initial amount.

3. Mechanism for controlling the operation of fluid pressure actuated brakes or the like, including in combination, a fluid pressure supply controlling valve member, piston means responsive to the controlled pressure for exerting a closing force on said valve member, spring means adapted to resist movement of said piston in response to said controlled pressure, movable means for varying the resisting force of said spring means, and resilient means for resisting movement of said movable means, said resilient means being effective to offer such resistance only after a predetermined initial movement has been given said movable means.

FREDERICK G. FOLBERTH.
WILLIAM M. FOLBERTH.